United States Patent
Rosa et al.

(10) Patent No.: US 11,182,269 B2
(45) Date of Patent: Nov. 23, 2021

(54) PROACTIVE CHANGE VERIFICATION

(71) Applicant: INTERNATIONAL BUSINESS MACHINES CORPORATION, Armonk, NY (US)

(72) Inventors: Daniel Rosa, Highland, NY (US); Donald William Schmidt, Stone Ridge, NY (US); Qi Liang, Shanghai (CN); Gui Yu Jiang, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 149 days.

(21) Appl. No.: 16/589,246

(22) Filed: Oct. 1, 2019

(65) Prior Publication Data
US 2021/0096976 A1    Apr. 1, 2021

(51) Int. Cl.
*G06F 11/00*        (2006.01)
*G06F 11/34*        (2006.01)
*G06F 11/30*        (2006.01)

(52) U.S. Cl.
CPC ...... *G06F 11/3433* (2013.01); *G06F 11/3024* (2013.01)

(58) Field of Classification Search
CPC .............. G06F 11/3409; G06F 11/079; G06F 11/0793; G06F 11/0751; G06F 11/008;
(Continued)

(56) References Cited

U.S. PATENT DOCUMENTS 6,738,933 B2    5/2004    Fraenkel et al.
7,194,445 B2    3/2007    Chan et al.
(Continued)

FOREIGN PATENT DOCUMENTS

CN    103986625 A    8/2014
CN    105138445 A    12/2015
CN    109741026      5/2019

OTHER PUBLICATIONS

Transmittal Form PTO/SB/21, filed Mar. 16, 2020.
(Continued)

*Primary Examiner* — Amine Riad
(74) *Attorney, Agent, or Firm* — Cantor Colburn LLP; Teddi Maranzano

(57) ABSTRACT

A computer-implemented method for proactive change verification is provided. Aspects include analyzing runtime execution characteristics from a plurality of base activity metrics and a plurality of experimental activity metrics and creating a plurality of activity pairs wherein each activity pair comprises a base activity metric and its corresponding experimental activity metric. Aspects also include identifying significant activity pairs from the plurality of activity pairs wherein the experimental activity significantly deviates from its corresponding base activity and classifying significant activity pairs by deviation type. Aspects further include sorting activity pairs by their impact and removing activity pairs that have an impact of less than a threshold amount, wherein the threshold amount is based on the deviation type. Aspects also include correlating interacting
(Continued)

impactful activity pairs temporally and prioritizing impactful activity pairs using experimental activity deviations and displaying the impactful activity pairs.

20 Claims, 3 Drawing Sheets

(58) Field of Classification Search
CPC ............ G06F 11/0709; G06F 11/3055; G06F 11/3006; G06F 11/3411
See application file for complete search history.

(56) References Cited

U.S. PATENT DOCUMENTS

| | | | |
|---|---|---|---|
| 7,752,013 | B1 | 7/2010 | Broyles |
| 7,865,958 | B2 | 1/2011 | Lieblich et al. |
| 8,095,507 | B2 | 1/2012 | Wu et al. |
| 8,312,465 | B2 | 11/2012 | Pierce et al. |
| 8,566,956 | B2 | 10/2013 | Slater |
| 8,879,728 | B2 | 11/2014 | Macmillan et al. |
| 9,063,802 | B2* | 6/2015 | Viswanathan ...... G06F 11/3072 |
| 9,224,168 | B2 | 12/2015 | Thirumalai et al. |
| 9,823,994 | B2 | 11/2017 | Altman et al. |
| 2013/0158950 | A1 | 6/2013 | Cohen et al. |
| 2015/0293965 | A1* | 10/2015 | Gullin ................... G06F 16/273 707/690 |
| 2017/0206462 | A1 | 7/2017 | Arndt et al. |
| 2018/0121275 | A1* | 5/2018 | Park ................... G06F 11/0751 |
| 2018/0196727 | A1 | 7/2018 | Giamei et al. |
| 2019/0192164 | A1 | 6/2019 | Parekh et al. |
| 2019/0207759 | A1 | 7/2019 | Chan et al. |
| 2019/0207767 | A1 | 7/2019 | Ahn |
| 2019/0236302 | A1 | 8/2019 | Czerkowicz et al. |
| 2021/0058453 | A1* | 2/2021 | Balasubramanian ... H04L 43/08 |

OTHER PUBLICATIONS

Anonymous "System and Method for Requirements and Capabilities Pairing via Self-Learning Analytical Engine", IP.com No. IPCOM000226901D; Publication Date Apr. 23, 2013; 4 pgs.

Barber, Ronald et al. "In-Memory BLU Acceleration in IBM's DB and dashDB: Optimized for Modern Workloads and Hardware Architectures", 2015 IEEE; ICDE Conference 2015; pp. 1246-1252.

Downey, Allen B., et al. "The Elusive Goal of Workload Characterization", SIGMETRICS Performance Evaluation Rev. 26, 4 (Mar. 1999), pp. 14-29.

Feitelson, Dror G. "Locality of Sampling and Diversity in Parallel System Workloads", Proceedings of the 21st Annual Int'l Conference on Computercomputing (ICS '07), ACM, New York, NY, pp. 53-63.

Malik, Haroon et al. "Detecting Discontinuities in Large-Scale Systems", 2014 IEEE, ACM 7th Int'l Conference on Utility and Cloud Computing, London, 2014, pp. 345-354.

Malik, Tanu et al. "Workload-Aware Histograms for Remote Applications", In Int'l Conference on Data Warehousing and Knowledge Discovery, Springer, Berlin, Heidelberg, 2008; pp. 402-412.

Malony, Allen D., et al. "A Hardware-Based Performance Monitor for the Intel iPSC/2 Hypercube", Proceedings of the 4th Int'l Conference on Supercomputing (ICS '90), ACM, New York, NY, pp. 213-226.

Zaharia, Matei et al. "Apache Spark: A Unified Engine for Big Data Processing", Communications of the ACM; Nov. 2016; vol. 59; No. 11; pp. 56-65.

Zhang, Xiao et al. "TaskInsight: A Fine-grained Performace Anomaly Detection and Problem Locating System", 2016 IEEE, 9th Int'l Conference on Cloud Computing (CLOUD), San Francisco, CA 2016, pp. 917-920.

* cited by examiner

PROACTIVE CHANGE VERIFICATION

BACKGROUND

The present invention relates to computer servers, and particularly to proactive change verification.

Operating systems (e.g. z/OS) provide controls to share finite hardware resources amongst client services. A workload consists of one or more jobs performing computing for similar client services. When multiple workloads are executing in parallel on the same operating system, a component (e.g. Workload Manager (WLM) on z/OS) provides controls to define attributes for each workload such as an importance level and a goal (e.g. response time). At regular intervals (e.g. every 10 s), this component assesses the results of each workload and may change the scheduler priority attribute of each workload so most important workloads achieve their goals. Work represents the aggregate computing performed across all workloads.

An operating system instructs a computer about how to process a workload. Whenever workload runtime execution characteristics change, a program or the workload itself changed. Program changes can include client application changes to improve services or updating purchased software products. When no programs changed, arrival pattern changes affect workload interactions and cause runtime execution characteristics to change.

In the industry, analysts have limited technology to detect changes in workload runtime execution characteristics. Data is either too general for too long an interval to detect transient changes or too detailed to summarize with low cost. As a result, workload runtime execution characteristics are analyzed reactively when a problem occurs. Even with better data, an analyst must manually compare runtime execution characteristics before and after. If an analyst had an analytics engine that could quickly surface prioritized differences in runtime execution characteristics, an analyst could perform cost-effective proactive change verification for any program changes. Furthermore, if no program changes occurred but the workload results changed nonetheless, proactive change verification can be used to detect arrival pattern changes and their effects on the workload.

SUMMARY

According to one or more embodiments, a computer-implemented method for proactive change verification is provided. The method includes analyzing runtime execution characteristics from a plurality of base activity metrics and a plurality of experimental activity metrics and creating a plurality of activity pairs wherein each activity pair comprises a base activity metric and its corresponding experimental activity metric. The method also includes identifying significant activity pairs from the plurality of activity pairs wherein the experimental activity significantly deviates from its corresponding base activity and classifying significant activity pairs by deviation type. The method further includes correlating interacting impactful activity pairs temporally and prioritizing impactful activity pairs using experimental activity deviations and displaying the impactful activity pairs.

According to one or more embodiments, a computer program product includes a memory device with computer executable instructions therein, the instructions when executed by a processing unit perform a method of analyzing experimental and base measurements using activity pairs. The method includes analyzing runtime execution characteristics from a plurality of base activity metric and a plurality of experimental activity metric and creating a plurality of activity pairs wherein each activity pair comprises a base activity metrics and its corresponding experimental activity metric. The method also includes identifying significant activity pairs from the plurality of activity pairs wherein the experimental activity significantly deviates from its corresponding base activity and classifying significant activity pairs by deviation type. The method further includes correlating interacting impactful activity pairs temporally and prioritizing impactful activity pairs using experimental activity deviations and displaying the impactful activity pairs.

According to one or more embodiments, a system includes memory, and a processor coupled to the memory, the processor performs a method of proactive change verification. The method includes analyzing runtime execution characteristics from a plurality of base activity metrics and a plurality of experimental activity metrics and creating a plurality of activity pairs wherein each activity pair comprises a base activity metric and its corresponding experimental activity metric. The method also includes identifying significant activity pairs from the plurality of activity pairs wherein the experimental activity significantly deviates from its corresponding base activity and classifying significant activity pairs by deviation type. The method further includes correlating interacting impactful activity pairs temporally and prioritizing impactful activity pairs using experimental activity deviations, and displaying the impactful activity pairs.

In one or more embodiments, diagnostic data can be generated in a human consumable form for human analysis or in a machine consumable form for machine analysis through machine learning.

Embodiments of the present invention further include a system and computer program product each configured to perform the method described above.

DETAILED DESCRIPTION

Figure 1:
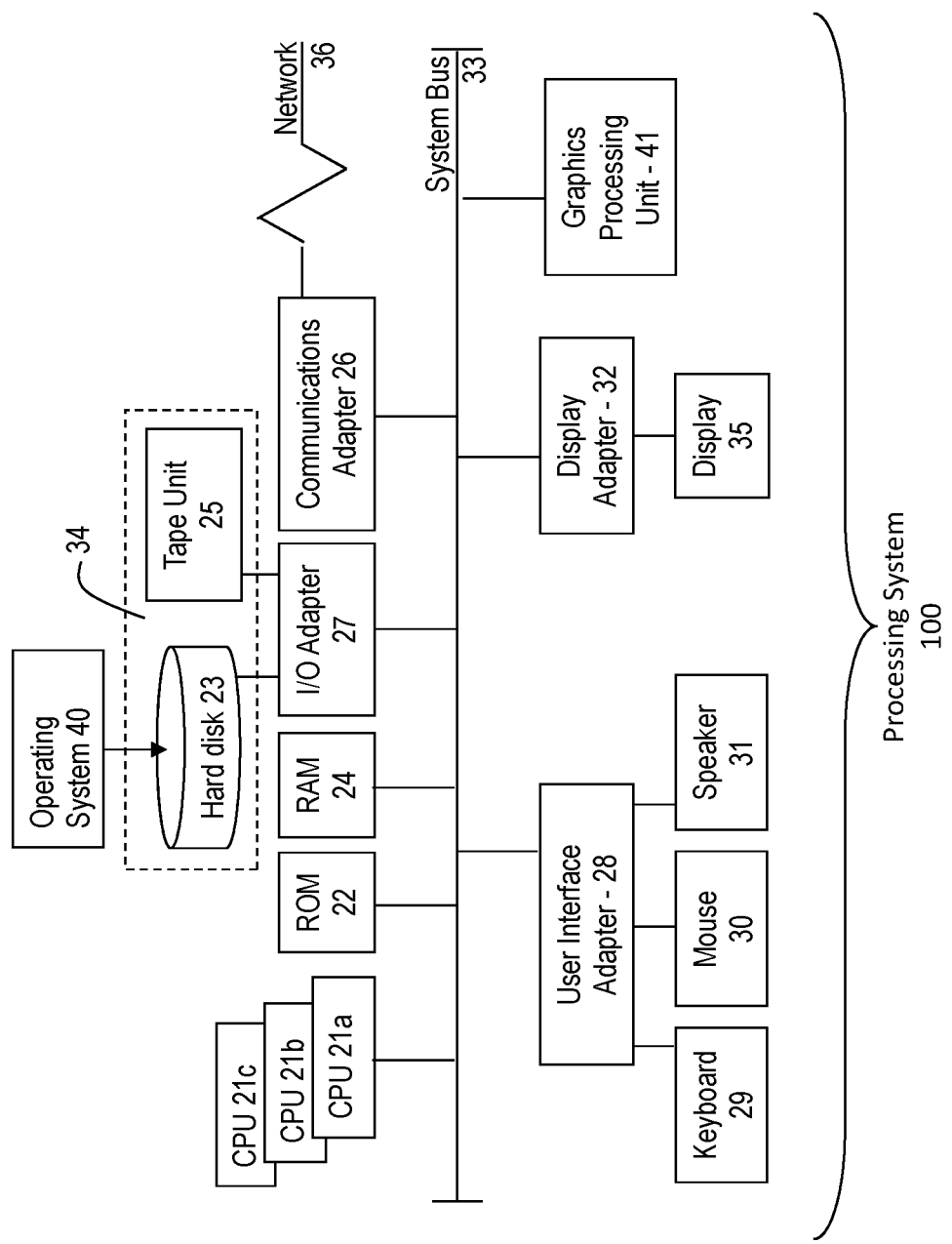
FIG. 1 illustrates a block diagram of a computer system for use in implementing one or more embodiments of the present invention.

Assessing the performance of workloads on computing systems can be an important part of the testing and day-to-day operation of workloads. Traditionally such assessments are accomplished through workload performance instrumentation that includes a workload and component summary collected at a long interval (e.g. 15 minutes). Performance analysts begin with assessing the overall workload and component summary. When the overall results are unexpected, a performance problem occurred during most of the long interval (e.g. the problem occurred for 10 out of 15 minutes) and the analyst must further investigate.

A computer server ("server") makes finite hardware resources available to multiple applications. The server consists of many stack layers (e.g. middleware, operating system, hypervisor, and hardware). Every stack layer contains components (single to double digits) that manage resources (single digits to thousands) that are virtualized to the applications, and consequently to the users of those applications. The workload consists of stack layers, components, and user requests. The workload context consists of component activities and resources and their interdependencies and interactions. As the arrival pattern changes, the workload context changes.

A workload performance problem typically describes a problem symptom like a slow/erratic response time or high resource contention. The overall workload and component summary are investigated and the problem is sent to the component that is most likely the problem source for further diagnosis. A component expert generally begins with first failure data capture that includes a multi-minute (e.g. 15 minutes) component summary of activity (e.g. requests, response times) to identify normal and anomalous results. If no anomalous results are found, the component is not obviously involved and the problem is sent to a different component expert. When an individual component discovers anomalous results or all components have no anomalous results in the summary, component details (e.g. all component activity records) must be investigated. Each component has its own controls to capture component details due to high CPU overheads associated with collecting component details. Collecting component details requires recreating the problem. If the component details across all suspected components do not contain information about the anomalous results, new traces and diagnostics must be pursued. With the necessary component details, an expert will be able to define the problem or route the problem to another expert to investigate further. Recreating the problem to collect new data, transform data, analyze data, engage new experts, collect additional data, and correlate data across components increases the time required to define the workload context and ultimately define the underlying problem.

Prior art enables a consistent, prescribed, summary data generation format across base and anomalous data. This prior art comprises measuring activity metrics, aggregating lower level activity metrics into higher level user constructs for each user/consumer, generating condensed diagnostic data by grouping users/consumers into buckets based on bucket and user/consumer attributes, aggregating user/consumer activity metrics across all users/consumers in each bucket, including one or more most significant users/consumers and corresponding user/consumer activity metrics for each activity in each bucket, and recording bucket contents. In the prior art, each user/consumer belongs to a single bucket.

Prior art smarter data generation enables subject matter experts to manually compare micro-trend analysis engine base results (e.g. before change(s)) to micro-trend analysis engine anomalous results (e.g. after software change(s)). Based on this manual review, the subject matter experts are able to narrow the focus to the implicated workload component(s), identify the problem symptom(s), and create a performance problem definition that fits the available clues. During this manual review process, a subject matter expert spends significant time ignoring noisy micro-trends (e.g. thousands) and identifying meaningful micro-trends (e.g. single to double digits), and temporally correlating them into groups behaving anomalously. In the industry, because this process is so time consuming, this type of analysis is typically only done when a performance problem is reported or when a change is expected to have performance impacts.

The present invention enables an analyst to perform proactive change verification by providing an analyst with a smarter analytics engine that greatly reduces the cost of doing performance analysis. To begin, an analytics engine is configured to analyze base and experimental measurements. In exemplary embodiments, the analytics engine processes a base micro-trend measurement to calculate base measurement metrics and processes an experimental measurement to calculate experimental measurement metrics. The analytics engine creates activity pairs, where each pair consists of one activity metric from the base measurement and its corresponding activity metric the experimental measurement metrics. Based on an analysis of these activity pairs, the analytics engine displays to the analyst prioritized, temporally correlated groups of activities significantly deviating from their base. In exemplary embodiments, the analytics engine reduces the time and skills required to implicate impacted workload component(s) and to identify the problem symptom(s).

Prior art facilitates diagnosing workload performance problems by generating synchronized activity data (e.g. requests, CPU execution time, response time) across providing peers at a human consumable interval (e.g. greater than one second), establishing the activity base-line (e.g. mean), identifying base-line deviations (e.g. deviating 10% above or below the base-line), and temporally correlating base-line deviations. A point represents a single human consumable interval. A micro-trend is a short-duration (e.g. one or more high-frequency points) deviation from the base-line. Further, every micro-trend contains a peak point for every base-line deviation period above the base-line or a valley point for every base-line period below the base-line. Micro-trend peak and valley point correlations are used to identify cause and victim peers amongst component activities and resources across the stack.

One or more embodiments of the present invention facilitate an analytics engine analyzing micro-trends between a base measurement (e.g. a workload operating in a normal manner) and an experimental measurement (e.g. a workload operating which may be operating in a normal or anomalous manner) by creating and analyzing activity pairs.

One or more embodiments of the present invention addresses technical challenges and facilitate an analyst to quickly investigate component data to identify normal and anomalous activity and determine the workload context. Accordingly, one or more embodiments of the present invention facilitate decreasing the time required to determine the involved components, their interdependencies, their interactions, and how they are being affected by the underlying performance problem. One or more embodiments of the present invention are rooted in computing technology, particularly diagnosing workload performance problems in computer servers. Further, one or more embodiments of the present invention improves existing solutions to the technical challenge in computing technology by significantly reducing the time required to identify normal and anomalous activity and determine the workload context.

In exemplary embodiments, for each activity, an analytics engine establishes base measurement activities as normal and uses them as training data. Then the analytics engine compares each base measurement activity to the same experimental measurement activity to create an activity pair. The analytics engine analyzes the activity pairs and characterizes, identifies, correlates, and prioritizes activity pairs whose experimental activity is significantly different when compared to its corresponding base activity.

In one embodiment, the analytics engine characterizes activities by removing noise (e.g., insignificant variances between the base measurement activity and the same experimental measurement activity), thereby ignoring less impactful differences. In addition, the analytics engine identifies meaningful significant activity pairs wherein the experimental activity significantly deviates from its corresponding base activity by deviation type. The analytics engine forms correlated groups by temporally correlating experimental interacting activity deviations from their base-line. Then the analytics engine prioritizes the deviation types and significant activity pairs in each group by interacting experimental activity deviation from its base-line. This allows an analytics engine to show an analyst an organized, prioritized, temporally correlated progression of meaningful activity pairs behaving differently at the push of a button.

Standardized, synchronized, smarter activity pair analysis decreases the time and skills needed to detect and diagnose performance problems. Client, service, and performance teams can do faster triage to implicate workload components and engage the right experts to define the problem. All teams can more quickly determine cause and effect interactions and interdependencies between workload components and their activities.

In addition, the solution quality improves with activity pair analysis. Development can better evaluate design decisions by analyzing activity pair result differences between measurements. In exemplary embodiments, the activity pair analysis provides a feedback loop for any action taken. If results worsened, the team can investigate why and make appropriate changes (e.g. add more workers, undo changes, etc.). If results improved, the team can further emphasize the behavior.

FIG. 1 depicts a processing system for implementing one or more embodiments of the present invention. It is understood that one or more embodiments of the present invention are capable of being implemented in conjunction with any other type of computing environment now known or later developed. For example, FIG. 1 depicts a block diagram of a processing system 100 for implementing the techniques described herein. In the embodiment shown in FIG. 1, processing system 100 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 100.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. Hard disk 23 and tape storage device 25 are collectively referred to herein as mass storage 34. Operating system 40 for execution on processing system 100 can be stored in mass storage 34. The RAM 24, ROM 22, and mass storage 34 are examples of memory 19 of the processing system 100. A network adapter 26 interconnects system bus 33 with an outside network 36 enabling the processing system 100 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

Thus, as configured herein, processing system 100 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 100.

Figure 2:
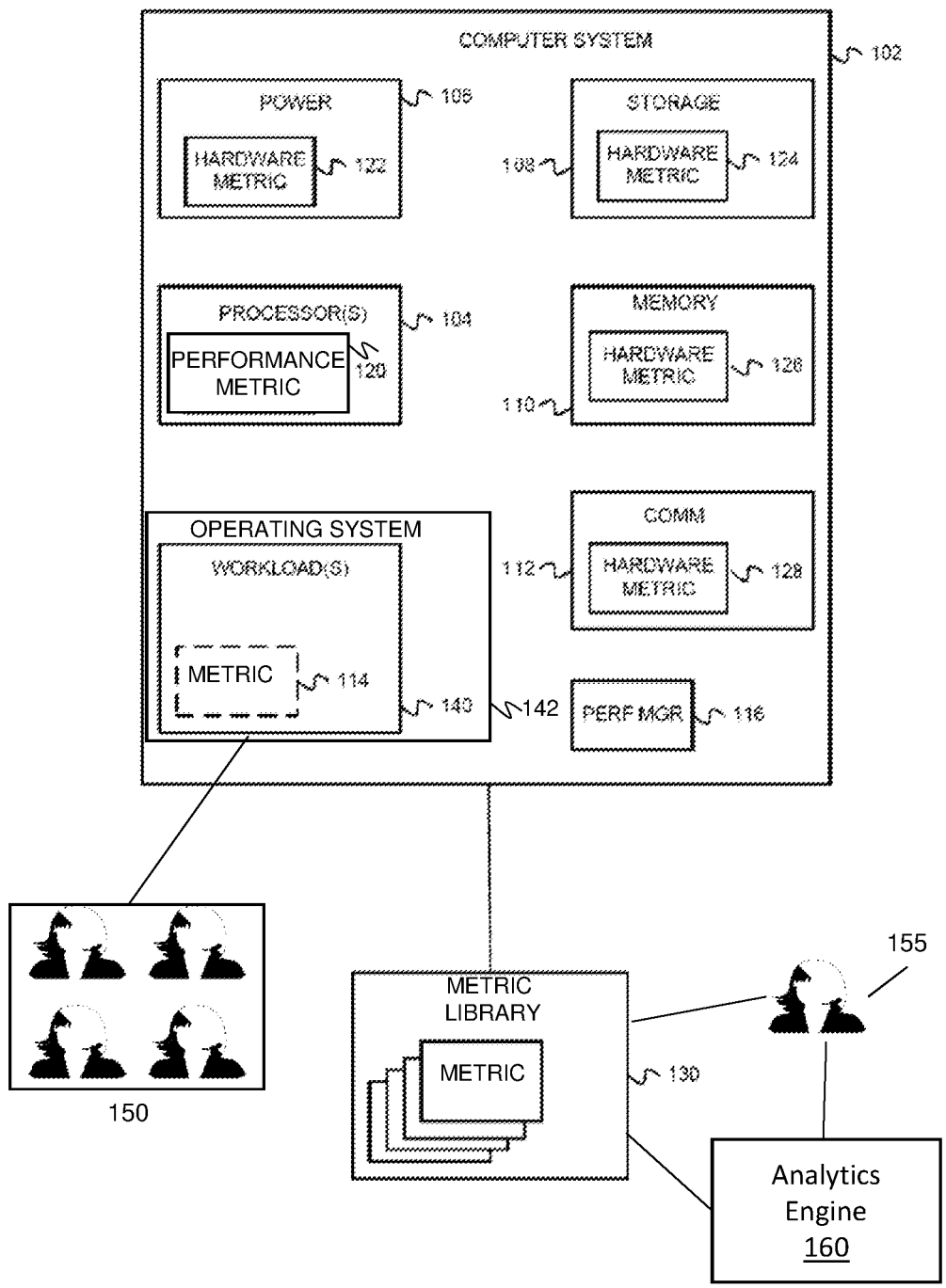
FIG. 2 depicts a block diagram of a system that collects resource and activity metrics according to one or more embodiments of the present invention.

Referring now to FIG. 2, a block diagram of a system that collects performance metrics according to one or more embodiments of the present invention is shown. In some embodiments, system includes a computer system 102, performance manager 116, and metric library 130. Computer system 102 may include processors 104, memory 110, and power subsystem 106, among other components. Computer system 102 may optionally include storage subsystem 108 and communication subsystem 112. The computer system 102 can run multiple operating systems 142 (e.g. z/OS) that run multiple workloads 140 (e.g. On-Line Transaction Processing [OLTP] and batch) to satisfy requests from multiple users 150. In some operating systems (e.g. z/OS), a user instance (150) is embodied in a job (e.g. a work unit for the operating system to complete).

Processors 104 may include one or more processors, including processors with multiple cores, multiple nodes, and/or processors that implement multi-threading. In some embodiments, processors 104 may include simultaneous multi-threaded processor cores. Processors 104 may maintain performance metrics 120 that may include various types of data that indicate or can be used to indicate various performance aspects of processors 104. Performance metrics 120 may include counters for various events that take place on the processors or on individual processor cores on a processor. For example, a processor may have architected registers that maintain counts of instructions, floating point operations, integer operations, on-processor cache hits and misses, pipeline stalls, bus delays, etc. Additionally, time may be a performance metric. Registers or other data locations or functions that maintain a time value may be used as a performance metric 120 in some embodiments.

Memory 110 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.). A memory controller for memory 110 may maintain performance metrics 126 that may include various types of data that indicate or can be used to derive indicators of memory performance. For example, memory performance metrics 126 may include a counter for the number of memory accesses, type of accesses (e.g., read or write access), cache hits, cache misses, etc.

Power subsystem 106 provides and regulates the power to the various components of computer system 102. Power subsystem 106 may maintain performance metrics 122 that comprise voltage levels for various rails of one or more power supplies in power subsystem 106.

Storage subsystem 108, when present, provides persistent storage for computer system 102. Such storage can include hard disks, optical storage devices, magnetic storage devices, solid state drives, or any suitable combination of the foregoing. Storage subsystem 108 may maintain performance metrics 124 that may include counts of read or write accesses, or timing information related to reads, writes and seeks.

Communication subsystem 112, when present, provides network communication functions for computer system 102. Communication subsystem 112 may maintain performance metrics 128 that may include counts of packets transmitted and received and other data regarding network communications. In some embodiments, communication subsystem 112 may include a network interface (e.g., an ATM interface, an Ethernet interface, a Frame Relay interface, SONET interface, wireless interface, etc.)

The computer system 102 contains operating systems (142) that can be configured to process workloads 140. A workload 140 is a set of tasks interacting to complete requests from users 150. An operating system 142 maintains performance metrics 114 for each user about its communication activity (e.g. data size) and resource use (e.g. time using network adapter to send/receive packets from communication subsystem 112). In some embodiments, a performance manager 116 facilitates tracking performance metrics (e.g. read and write accesses from memory subsystem 126) and updating workload and user metrics. Different workloads may have different characteristics. For example, OLTP (On-Line Transaction Processing) workloads typically involve many data entry or retrieval requests that involve many short database interactions. Data mining workloads on the other hand have few interactions with users, but more complicated and lengthy database interactions. Different types of workloads 140 may have different impacts on the activities and resources of computer system 102.

In one or more embodiments of the present invention, a lightweight method includes an instruction sequence to aggregate the metrics described above is used during mainline operation of the workload. In one or more examples, the lightweight method is always running during mainline processing to aggregate metrics about computer system resource 102 use and the workload activity 140.

In exemplary embodiments, the performance manager 116 calculates metrics from the components of the computer system 102 including the workload 140 at periodic intervals. The metrics for each component are generated in a continuous and always-on manner as described herein. In one or more embodiments of the present invention, an administrator can switch off the data generation via the performance manager 116. Data generation is based on a synchronized interval across the whole computer system 102. Once different component metrics are using different intervals, correlations are much less viable. Consequently, the metric deltas are computed at the synchronized intervals across all components.

The metric library 130 represents the collection of metrics 120, 122, 124, 126, 128 that the performance manager 116 produced across all aspects of the computer system 102. The metric library 130 may be part of computer system 102, or it may be maintained on a separate system that is available to the computer system 102.

In some embodiments, the metrics aggregated and captured are customized for a particular hardware implementation and/or for particular type of workload 140. For example, for a particular workload 140, the metrics that are aggregated and captured only includes hardware metrics 120 for the used family of processors and memory subsystems.

The analytics engine 160 is connected with the metric library 130. In exemplary embodiments, the analytics engine 160 may reside on the computer system 102 or a separate processing system, such as the processing system 100 described hereinabove and illustrated in FIG. 1, or in some other type of computing or processing environment. In exemplary embodiments, an analyst 155 chooses a base measurement interval and all its associated base activity metrics from the metric library 130 are input to the analytics engine 160 as training data. Next, a change is introduced into the computer system 102. The change can be internal such as reconfiguring software, applying software maintenance, or deploying a new function or application. Also, the change can be external to computer system 102 such as changing the flow of requests inbound to the computer system 102. After the change is in place, an analyst 155 chooses an experimental measurement interval and all its associated experimental activity metrics from the metric library 130 that are input to the analytics engine 160 as test data. The metrics analytics engine 160 then creates a plurality of activity pairs using the same activity from the base and experimental measurements. The analytics engine 160 analyzes the activity pairs and characterizes, identifies, correlates, and prioritizes activity pairs whose experimental activity is noticeably different than the base activity.

Figure 3:
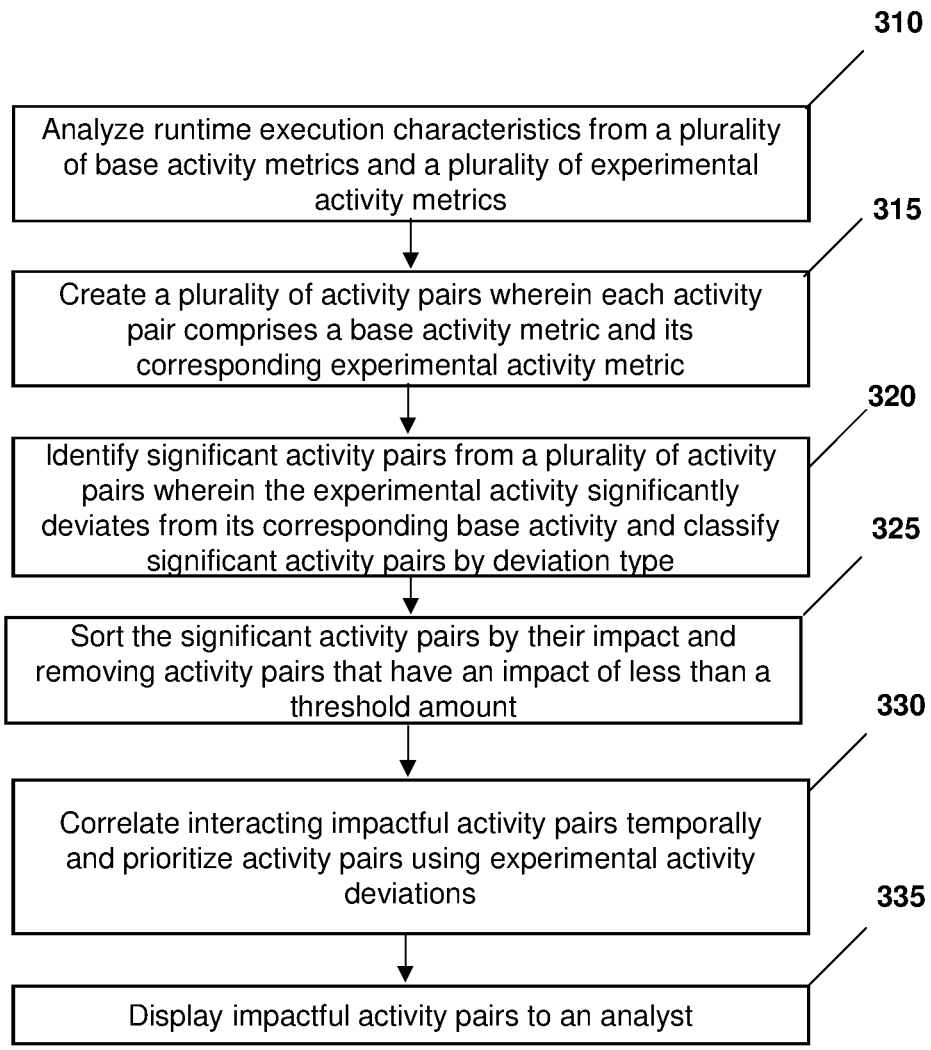
FIG. 3 depicts a flowchart of a method for proactive change verification according to one or more embodiments of the present invention.

FIG. 3 depicts a flowchart for the method for proactive change verification according to one or more embodiments of the present invention. As illustrated, the method begins at block 310, by analyzing runtime execution characteristics from a plurality of base activity metrics and a plurality of experimental activity metrics. In exemplary embodiments, analyzing runtime execution characteristics from the plurality of base activity metrics and the plurality of experimental activity metrics includes performing mathematical analysis on the runtime execution characteristics from the plurality of base activity metrics and the plurality of experimental activity metrics to characterize differences between the experimental activity and the base activity.

In exemplary embodiments, analyzing runtime execution characteristics from the plurality of base activity metrics and the plurality of experimental activity metrics comprises calculating a mean value for each base activity metric ($mean_b$) and experimental activity metric ($mean_e$) In addition, analyzing runtime execution characteristics from the plurality of base activity metrics and the plurality of experimental activity metrics includes calculating a Mean Deviation Peak value for each base metric ($MDP_b$) and experimental metric ($MDP_e$), calculating a Relative Deviation Peak value for each base metric ($RDP_b$) and experimental metric ($RDP_e$), calculating a Mean Deviation Valley value for each base metric ($MDV_b$) and experimental metric ($MDV_e$), calculating a Relative Deviation Valley value for each base metric ($RDV_b$) and experimental metric ($RDV_e$), calculating a Relative Deviation for each base metric ($RD_b$) and experimental metric ($RD_e$), determining a significant deviation direction for each base metric and when there is a significant deviation direction calculating the base metric's Generic Relative Deviation ($GRD_b$), and determining a significant deviation direction for each experimental metric and when there is a significant deviation direction calculating the experimental metric's Generic Relative Deviation ($GRD_e$).

In exemplary embodiments, an analytics engine accepts input base and experimental measurements and extracts runtime execution characteristics from the plurality of base and experimental activity metrics. The base and experimental activity metrics are then independently analyzed and characterized by the analytics engine. The analysis includes determining a base-line by calculating a mean value for each base and experimental activity metric. The mean is equivalent to the sum of all point and divided by the number of points.

In exemplary embodiments, the analysis includes summarizing significant deviation peak points from the mean by reducing every base-line deviation peak period (e.g. one or more consecutive deviation points 10% above the mean) to a single highest deviation peak point. In one embodiment, the analytics engine sets a percent (e.g. 10%) to determine the deviation peak period. In another embodiment, a performance analyst can configure the percent to include more or fewer peak points and activity metrics. In exemplary embodiments, when there is a tie, the earlier peak point is chosen. By consolidating each deviation peak period to a single peak point, noise is removed from the data. Next, the two largest deviation peak points are identified and averaged. Peak points below 45%*((2–largest peak points' average)–mean)+mean are removed from the data set, which ignores less impactful peak points to further remove noise. A Mean Deviation Peak (MDP) is calculated to be (sum of the remaining peaks points' absolute value deviation from the mean)/(number of remaining peak points) and a Relative Deviation Peak (RDP) is calculated to be MDP/Max(mean, 1).

In exemplary embodiments, the analysis includes summarizing significant deviation valley points from the mean by reducing every base-line deviation valley period (e.g. one or more consecutive deviation points 10% below the mean) to a single lowest deviation valley point. In one embodiment, the analytics engine sets a percent (e.g. 10%) to determine the deviation valley period. In another embodiment, a performance analyst can configure the percent to include more or fewer valley points and activity metrics. In exemplary embodiments, when there is a tie, the earlier valley point is chosen. By consolidating each deviation valley period to a single valley point, noise is removed from the data. Next, the two largest deviation valley points are identified and averaged. Valley points above 45%*(2–largest valley points' average–mean)+mean and the removed from the data set, which ignores less impactful valley points to further remove noise. A Mean Deviation Valley (MDV) is calculated to be (sum of the remaining valley points' absolute value deviation from the mean)/(number of remaining valley points) and a Relative Deviation Valley (RDV) is calculated to be MDV/Max(mean, 1). In other embodiments, the analysis also includes calculating RDV=MDV/Max(mean–MDV, 1) which makes RDV and RDP more comparable.

In exemplary embodiments, the analysis also includes determining whether peak or valley points deviate most from the mean by calculating the Relative Deviation (RD)=Max(RDP, RDV). Next, the analysis includes determining if there is a significant asymmetry between the remaining peak and valley points by determining if the significant deviation direction is up when MDP>=30%*mean and MDP>=2*MDV or is down when MDV>=30%*mean and MDV>=2*MDP. Otherwise, the significant deviation direction is directionless, activity metric analysis in block 310 is complete, and processing continues with processing in block 315 to create a plurality of significant activity pairs.

In exemplary embodiments, when the significant deviation direction is up or down, analysis also includes excluding extreme deviations from the mean to establish a more representative point of reference, referred to as the adjusted_mean. In exemplary embodiments, when the significant deviation direction is up, points above 45%*((2–largest peak points' average)–mean)+mean are excluded, the muted mean is calculated from the remaining points, then points 10% above the mean are excluded, and the noiseless mean is calculated from the remaining points, and the adjusted_mean is calculated as (muted mean)–((muted mean)–(noiseless mean)/2), and MDP and RDP are recalculated using the adjusted_mean. In exemplary embodiments, when the significant deviation direction is down, points below 45%*(2–largest valley points' average–mean)+mean are excluded, the muted mean is calculated from the remaining points, then points 10% below the mean are excluded, and the noiseless mean is calculated from the remaining points, and the adjusted_mean is calculated as (noiseless mean)–((noiseless mean)–(muted mean)/2), and MDV and RDV are recalculated using the adjusted_mean.

In exemplary embodiments, when the significant deviation direction is up or down, a Generic Relative Deviation is calculated, which enables comparing base and experimental activity pairs as follows: When RDP>RDV, Generic Relative Deviation (GRD)=RDP; and When RDP<=RDV, Generic Relative Deviation (GRD)=–RDV.

In exemplary embodiments, when the significant deviation direction is directionless, there is no generic relative deviation (GRD). Next, as shown at block 315, the method includes creating a plurality of activity pairs wherein each activity pair consists of a base activity metric and its corresponding experimental activity metric.

The method further includes identifying significant activity pairs wherein the experimental activity significantly deviates from its corresponding base activity and classify significant activity pairs by deviation type as shown in block 320. One embodiment identifies significant activity pairs whose experimental mean significantly deviates from its corresponding base mean by having a Mean Delta (MD)=|$mean_b$–$mean_e$|/$mean_e$ greater than a threshold percent and classifying those activity pairs as having a deviation type of mean. In this embodiment, the analytics engine sets a mean delta threshold percent (e.g. 10%). In another embodiment, a performance analyst can configure the mean delta threshold percent to include more or fewer activity pairs. A second embodiment, identifies significant activity pairs whose experimental volatility (e.g. activity significantly deviating from the experimental base-line) deviates from its base activity by one or more of: 1. Significance where the experimental activity is significant and the base activity is insignificant by having $GRD_e$ non-zero and $GRD_b$ zero. 2. Transposition where one activity of the activity pair exhibits peak points and the other activity of the activity pair exhibits valley points by having $GRD_e$ and $GRD_b$ with opposite signs. 3. Intensity where the magnitude of the experimental activity increases or decreases substantially by having |[(|$GRD_e$|–|$GRD_b$|)/|$GRD_e$|]| greater than a deviation threshold percent and classifying those significant activity pairs as having a deviation type of volatility. In this embodiment, the analytics engine sets a deviation threshold percent (e.g. 10%). In another embodiment, a performance analyst can configure the deviation threshold percent to include more or fewer activity pairs.

Prior art smarter data generation facilitates measuring activity, aggregating lower level activity metrics into higher level user/consumer constructs for each user/consumer, generating condensed diagnostic data by grouping users/consumers into buckets based on bucket and user/consumer attributes, aggregating user/consumer activity metrics across all users/consumers in each bucket, including one or more most significant users/consumers and corresponding user/consumer activity metrics for each activity in each bucket, and recording bucket contents. In the prior art, each user/consumer belongs to a single bucket. For any activity, prior art enables deriving total workload activity by aggregating specific activity across all buckets. For any bucket activity, prior art also enables calculating the bucket activity percent of the workload activity whole. For example, prior art enables aggregating bucket requests across all buckets to yield total workload requests and calculating the bucket request percent of the workload requests.

In the present invention, significant activity pairs are comprised of an experimental activity that exceeds a deviation threshold when compared to its corresponding base activity. Experimental activity impact determines the importance of a significant activity pair. Experimental activity local impact is based on how important the experimental bucket activity is compared to the corresponding experimental workload activity by determining by the bucket activity percent of the workload activity whole. Experimental activity global impact is based on how important the experimental bucket is compared to the experimental workload whole. Experimental activity global impact is determined by a different bucket activity percent of its corresponding workload activity whole. In exemplary embodiments, activity global impact is based on bucket and workload CPU time activity which provides a proxy for bucket impact within the workload.

The method further includes sorting activity pairs by their impact and removing activity pairs that have an impact of less than a threshold amount, where the threshold amount is based on the deviation type, as shown in block 325. In exemplary embodiments, activity pairs with a deviation type of mean are sorted in descending order by the product of its experimental local impact and experimental global impact and the top n activity pair impacts (e.g. 20) are retained for analysis. In exemplary embodiments, activity pairs with a deviation type of volatility are sorted in descending order by experimental local impact and the top n activity pair impacts (e.g. 20) are retained for analysis.

Prior art facilitates standardized, synchronized, summarized, smarter data generation across providing peers at a human consumable interval (greater than one second) that can be temporally correlated. A point represents a single human consumable interval. A micro-trend is a short-duration (e.g. one or more high-frequency points) deviation from the base-line. Further, every micro-trend contains a peak point for every base-line deviation period above the base-line or a valley point for every base-line period below the base-line. Micro-trend peak and valley point correlations are used to identify cause and victim peers amongst component activities and resources across the stack.

Next, as shown at block 330, correlate interacting impactful activity pairs temporally and prioritize impactful activity pairs using experimental activity deviations. In exemplary embodiments, 1. correlate interacting impactful activity pairs with a deviation type of volatility into groups temporally by experimental activity peak and valley points wherein experimental activity peak and valley points are correlated when they occur one point before, during the same point, or one point after, 2. prioritize correlated groups in descending order by the number of members, 3. prioritize each activity pair in each correlated group by the absolute value of its experimental Generic Relative Deviation ($GRD_e$). Activity peak and valley points can be leading, synchronized, or trailing indicators, so activity peak and valley points are correlated when they occur within one point. In exemplary embodiments, prioritize activity pairs with a deviation type of mean in descending order by their Mean Delta (MD).

In an embodiment of the present invention, there are two nested deviations. A holistic deviation is the outermost nest deviation and comprises activity pairs whose experimental activity significantly deviates from their corresponding base activity as described in block 320. A holistic deviation comprises deviation types of mean and volatility. Each activity pair with a deviation type of volatility has an innermost nest deviation between the experimental activity and its experimental activity base-line which is used to correlate interacting impactful activity pairs temporally as described in block 330.

Last, the method also includes displaying the impactful activity pairs to an analyst as shown in block 335. In exemplary embodiments, an analytics engine graphically visualizes the important experimental impactful activity pairs with context and navigation buttons to show the experimental and base impactful activity, next and previous impactful activity pair, and next and previous deviation type and group. In exemplary embodiments, context can include the deviation type, group name, activity name, activity mean, activity sort and priority metric, amongst other metrics. This technology enables an analyst to quickly identify the important differences between base and experimental measurements.

One or more embodiments of the present invention provide such advantages through activity pair analysis. As a result, a performance analyst can quickly identify the significant and impactful interacting activity pairs, understand the problem symptoms, and define the performance problem without wasting time and resources investigating insignificant and unimpactful activity pairs. Because the analysis cost has been dramatically reduced, this technology enables cost effective proactive change verification to validate any program changes to applications or purchased products have not introduced a workload performance problem. Furthermore, if no program changes occurred but the workload results changed nonetheless, proactive change verification can be used to detect arrival pattern changes and their effects on the workload.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for proactive change verification, the method comprising:
    obtaining runtime execution characteristics from a plurality of base activity metrics during operation of a computer system;
    obtaining runtime execution characteristics from a plurality of experimental activity metrics after a change has been made to the computer system;
    analyzing the runtime execution characteristics from the plurality of base activity metrics and the plurality of experimental activity metrics;
    creating a plurality of activity pairs wherein each activity pair comprises a base activity metric and its corresponding experimental activity metric;
    identifying activity pairs of interest from the plurality of activity pairs wherein the experimental activity deviates from its corresponding base activity and classifying activity pairs of interest by a deviation type;
    sorting the activity pairs of interest by their impact and removing activity pairs that have an impact of less than a threshold amount, wherein the threshold amount is based on the deviation type;
    correlating interacting impactful activity pairs temporally and prioritizing impactful activity pairs using experimental activity deviations; and
    displaying impactful activity pairs.

2. The computer-implemented method of claim 1, wherein analyzing runtime execution characteristics from the plurality of base activity metrics and the plurality of experimental activity metrics comprises calculating a mean value for each base activity metric ($mean_b$) and experimental activity metric ($mean_e$).

3. The computer-implemented method of claim 2, wherein identifying the activity pairs of interest includes activity pairs whose experimental mean deviates from its corresponding base mean by having a Mean Delta (MD)= ($|mean_b-mean_e|/mean_e$) greater than a threshold percent and classifying those activity pairs as having a deviation type of mean.

4. The computer-implemented method of claim 3, further comprising sorting activity pairs by impact and removing less impactful activity pairs by deviation type wherein activity pairs with a deviation type of mean are sorted in descending order by the product of its experimental local impact and experimental global impact and the top n activity pair impacts are retained for analysis.

5. The computer-implemented method of claim 4, further comprising prioritizing activity pairs wherein prioritizing activity pairs with a deviation type of mean in descending order by their Mean Delta (MD).

6. The computer-implemented method of claim 1, wherein analyzing runtime execution characteristics from the plurality of base activity metrics and the plurality of experimental activity metrics comprises:
    calculating a Mean Deviation Peak value for each base metric ($MDP_b$) and experimental metric ($MDP_e$), wherein the Mean Deviation Peak value is a sum of remaining peaks points' absolute value deviation from the mean divided by a number of remaining peak points;
    calculating a Relative Deviation Peak value for each base metric ($RDP_b$) and experimental metric ($RDP_e$), wherein the Relative Deviation Peak value is calculated to be MDP divided by a larger of one and an average of $RDP_b$ and $RDP_e$;
    calculating a Mean Deviation Valley value for each base metric ($MDV_b$) and experimental metric ($MDV_e$), wherein the Mean Deviation Valley value is sum of remaining valley points' absolute value deviation from the mean divided by a number of remaining valley points;
    calculating a Relative Deviation Valley value for each base metric ($RDV_b$) and experimental metric ($RDV_e$), wherein the Relative Deviation Valley value is calculated to be MDV divided by a larger of one and an average of $RDV_b$ and $RDV_e$;
    calculating a Relative Deviation value for each base metric ($RD_b$) and experimental metric ($RD_e$), wherein the Relative Deviation value is calculated as a larger of RDP a larger of RDV;
    determining a deviation direction for each base metric and when there is a deviation direction, calculating the base metric's Generic Relative Deviation ($GRD_b$); and
    determining a deviation direction for each experimental metric and when there is a deviation direction, calculating the experimental metric's Generic Relative Deviation ($GRD_e$), wherein the GRD as the RDP when RDP is greater than RDV and as RDV when RDP is less than or equal to negative RDV.

7. The computer-implemented method of claim 6, wherein identifying the activity pairs of interest includes activity pairs whose experimental volatility deviates from its base activity by one or more of:

transposition where one activity of the activity pair exhibits peak points and the other activity of the activity pair exhibits valley points by having $GRD_e$ and $GRD_b$ with opposite signs; and intensity where the magnitude of the experimental deviation increases or decreases substantially by having an absolute value of [(the absolute value of $GRD_e$ minus the absolute value of $GRD_b$ divide by the absolute value of $GRD_e$] greater than a deviation threshold percent; wherein the method further comprises:

classifying those activity pairs of interest as having a deviation type of volatility.

8. The computer-implemented method of claim 7, further comprising sorting activity pairs by impact and removing less impactful activity pairs by deviation type wherein activity pairs with a deviation type of volatility are sorted in descending order by experimental local impact and the top n activity pair impacts are retained for analysis.

9. The computer-implemented method of claim 8, further comprising correlating interacting impactful activity pairs temporally and prioritizing activity pairs comprising:

correlating interacting impactful activity pairs with a deviation type of volatility into groups temporally by experimental activity peak and valley points wherein experimental activity peak and valley points are correlated when they occur one point before, during the same point, or one point after; and prioritizing correlated groups in descending order by the number of members; and prioritizing each activity pair in each correlated group by the absolute value of its experimental Generic Relative Deviation ($GRD_e$).

10. A computer program product comprising a memory device with computer executable instructions therein, the instructions when executed by a processing unit perform a method for proactive change verification, the method comprising:

obtaining runtime execution characteristics from a plurality of base activity metrics during operation of a computer system;

obtaining runtime execution characteristics from a plurality of experimental activity metrics after a change has been made to the computer system;

analyzing the runtime execution characteristics from the plurality of base activity metric and the plurality of experimental activity metrics;

creating a plurality of activity pairs wherein each activity pair comprises a base activity metric and its corresponding experimental activity metric;

identifying activity pairs of interest from the plurality of activity pairs wherein the experimental activity deviates from its corresponding base activity and classifying activity pairs of interest by a deviation type;

sorting activity pairs by their impact and removing activity pairs that have an impact of less than a threshold amount, wherein the threshold amount is based on the deviation type;

correlating interacting impactful activity pairs temporally and prioritizing impactful activity pairs using experimental activity deviations; and displaying impactful activity pairs.

11. The computer program product of claim 10, wherein analyzing runtime execution characteristics from the plurality of base activity metrics and the plurality of experimental activity metrics comprises calculating a mean value for each base activity metric ($mean_b$) and experimental activity metric ($mean_e$).

12. The computer program product of claim 11, wherein identifying the activity pairs of interest includes activity pairs whose experimental mean deviates from its corresponding base mean by having a Mean Delta (MD)= ($|mean_b-mean_e|/mean_e$) greater than a threshold percent and classifying those activity pairs as having a deviation type of mean.

13. The computer program product of claim 12, further comprising sorting activity pairs by impact and removing less impactful activity pairs by deviation type wherein activity pairs with a deviation type of mean are sorted in descending order by the product of its experimental local impact and experimental global impact and the top n activity pair impacts are retained for analysis.

14. The computer program product of claim 13, further comprising prioritizing activity pairs wherein prioritizing activity pairs with a deviation type of mean in descending order by their Mean Delta (MD).

15. The computer program product of claim 10, wherein analyzing runtime execution characteristics from the plurality of base activity metrics and the plurality of experimental activity metrics comprises:

calculating a Mean Deviation Peak value for each base metric ($MDP_b$) and experimental metric ($MDP_e$), wherein the Mean Deviation Peak value is a sum of remaining peaks points' absolute value deviation from the mean divided by a number of remaining peak points;

calculating a Relative Deviation Peak value for each base metric ($RDP_b$) and experimental metric ($RDP_e$), wherein the Relative Deviation Peak value is calculated to be MDP divided by a larger of one and an average of $RDP_b$ and $RDP_e$;

calculating a Mean Deviation Valley value for each base metric ($MDV_b$) and experimental metric ($MDV_e$), wherein the Mean Deviation Valley value is sum of remaining valley points' absolute value deviation from the mean divided by a number of remaining valley points;

calculating a Relative Deviation Valley value for each base metric ($RDV_b$) and experimental metric ($RDV_e$ wherein the Relative Deviation Valley value is calculated to be MDV divided by a larger of one and an average of $RDV_b$ and $RDV_e$;

calculating a Relative Deviation value for each base metric ($RD_b$) and experimental metric ($RD_e$), wherein the Relative Deviation value is calculated as a Max (RDP, RDV);

determining a deviation direction for each base metric and when there is a significant deviation direction, calculating the base metric's Generic Relative Deviation ($GRD_b$); and determining a deviation direction for each experimental metric and when there is a deviation direction, calculating the experimental metric's Generic Relative Deviation ($GRD_e$), wherein the GRD is the RDP when RDP is greater that RDV and as −RDV when RDP is less than or equal to negative RDV.

16. The computer program product of claim 15, wherein identifying the activity pairs of interest includes activity pairs whose experimental volatility deviates from its base activity by one or more of:
   transposition where one activity of the activity pair exhibits peak points and the other activity of the activity pair exhibits valley points by having $GRD_e$ and $GRD_b$ with opposite signs; and
   intensity where the magnitude of the experimental deviation increases or decreases substantially by having an absolute value of [the absolute value of $GRD_e$ minus the absolute value of $GRD_b$ divided by the absolute value of $GRD_e$] greater than a deviation threshold percent; wherein the method further comprises:
   classifying these activity pairs of interest as having a deviation type of volatility.

17. The computer program product of claim 16, further comprising sorting activity pairs by impact and removing less impactful activity pairs by deviation type wherein activity pairs with a deviation type of mean are sorted in descending order by the product of its experimental local impact and experimental global impact and the top n activity pair impacts are retained for analysis.

18. The computer program product of claim 17, further comprising correlating interacting impactful activity pairs temporally and prioritizing activity pairs comprising:
   correlating interacting impactful activity pairs with a deviation type of volatility into groups temporally by experimental activity peak and valley points wherein experimental activity peak and valley points are correlated when they occur one point before, during the same point, or one point after; and
   prioritizing correlated groups in descending order by the number of members; and
   prioritizing each activity pair in each correlated group by the absolute value of its experimental Generic Relative Deviation ($GRD_e$).

19. A system comprising:
   a memory; and
   a processor coupled to the memory, the processor configured to perform a method for proactive change verification, the method comprising:
   obtaining runtime execution characteristics from a plurality of base activity metrics during operation of a computer system;
   obtaining runtime execution characteristics from a plurality of experimental activity metrics after a change has been made to the computer system;
   analyzing the runtime execution characteristics from the plurality of base activity metrics and the plurality of experimental activity metrics;
   creating a plurality of activity pairs wherein each activity pair comprises a base activity metric and its corresponding experimental activity metric;
   identifying deviating activity pairs from the plurality of activity pairs wherein the experimental activity deviates from its corresponding base activity and classifying activity pairs of interest by a deviation type;
   sorting activity pairs by their impact and removing activity pairs that have an impact of less than a threshold amount, wherein the threshold amount is based on the deviation type;
   correlating interacting impactful activity pairs temporally and prioritizing impactful activity pairs using experimental activity deviations; and
   displaying impactful activity pairs.

20. The system of claim 19, wherein analyzing runtime execution characteristics from the plurality of base activity metrics and the plurality of experimental activity metrics comprises calculating a mean value for each base activity metric ($mean_b$) and experimental activity metric ($mean_e$).

* * * * *